United States Patent [19]

Häfner

[11] Patent Number: 4,577,519
[45] Date of Patent: Mar. 25, 1986

[54] GYROSCOPE LOAD CELL

[75] Inventor: Hans W. Häfner, Aichach, Fed. Rep. of Germany

[73] Assignee: Pfister GmbH, Fed. Rep. of Germany

[21] Appl. No.: 505,345

[22] Filed: Jun. 17, 1983

[30] Foreign Application Priority Data

Jul. 23, 1982 [DE] Fed. Rep. of Germany ....... 3227497

[51] Int. Cl.$^4$ ............................................. G01L 1/00
[52] U.S. Cl. .................... 74/5 F; 73/862.38; 74/5.22
[58] Field of Search ............... 74/5 F, 5.22; 267/160; 308/2 A; 464/100; 73/862.38

[56]  References Cited

U.S. PATENT DOCUMENTS

| 2,793,028 | 5/1957 | Wheeler | 74/5 F |
| 3,188,071 | 6/1965 | Owen | 267/160 |
| 3,301,073 | 1/1967 | Howe | 74/5 F X |
| 3,413,858 | 12/1968 | Samet | 74/5 F |
| 4,095,463 | 6/1978 | Wöhrl | 73/862.38 |

FOREIGN PATENT DOCUMENTS

| 2119546 | 11/1972 | Fed. Rep. of Germany . | |
| 2235808 | 2/1974 | Fed. Rep. of Germany . | |
| 2070784 | 9/1981 | United Kingdom | 73/862.38 |

Primary Examiner—Rodney H. Bonck
Attorney, Agent, or Firm—Hill, Van Santen, Steadman & Simpson

[57]  ABSTRACT

A gyroscope load cell which includes a gyroscope suspended in a housing and provided with the usual inner and outer gimbals. The specific improvement of the present invention is concerned with the joint between the inner and outer gimbals which, in the present case, consists of a V-strap hinge composed of a pair of straps intersecting along a line which intersects the precessional axis of the gyroscope at an angle of 90°.

4 Claims, 4 Drawing Figures

GYROSCOPE LOAD CELL

BACKGROUND OF THE INVENTION

1. Field of the Invention

This invention is in the field of gyroscope assemblies particularly those used for force measurement.

2. Description of the Prior Art

The fundamental concepts of the mechanics in the technology of gyroscopes are well known and can be found in textbooks such as "Kreiselgeräte" by von Fabeck, published by Vogel-Verlag.

There is a gyroscope load cell from the prior art consisting of a gyroscope whose precessional motion produced by the force to be measured is used to measure the force, and consists of an inner and outer gyroscope housing wherein the inner gyroscope housing is seated at an outer carrying stirrup by means of double garnet guides, these being supported in pivotal relation around the horizontal axis perpendicular to the axis of symmetry. This type of structure is described in German Patent No. 21 19 546.

A similar arrangement of a gyroscope load cell is known where the link joint between the inner gimbal and the outer gimbal consists of a double garnet joint as does the link between the rotatably seated device for force initiation and the inner gimbal. This type of structure is to be found in German Patent No. 22 35 808. In this patent, there are shown double garnet guides consisting of straps which are located cross-wise with respect to one another. The intersection of the straps accordingly exhibits no mechanical connection.

SUMMARY OF THE INVENTION

The present invention is directed to an improvement of the double garnet joint and arises from the determination that the joint axis migrates laterally out of the precessional axis in the case of a secondary precession and thus leads to measuring errors. This phenomenon will be explained in greater detail with reference to a graphic illustration of the geometric relationships of a double garnet joint of the prior art.

The secondary precession is a deviation of the angular position less than or greater than 90° of the inner gimbal relative to the precessional axis. It occurs due to uncompensated frictional forces under the influence of the moment of mass inertia of the precessing parts around the precessional axis as well as due to nutation as a result of force initiation.

The object of the present invention is to make an improved joint arrangement between the inner and outer gimbals which, while retaining the functional advantages of a strap hinge arrangement which functions friction free, avoids the error of migration of the secondary precessional axis or of the joint axis out of the precessional axis. Consequently, it assures the presence of orthogonality in gyroscope systems and gyrodynamic load cells under all load and operating conditions.

The object of the invention is accomplished by providing a link joint which comprises a V-strap hinge, the straps being disposed such that their axis of intersection which forms the joint axis intersects the precessional axis at an angle of 90°.

As will be later shown with reference to a graphic illustration of the geometry of a V-strap hinge, the V-strap hinge has the advantage that its working line does not migrate out of the precessional axis but only executes a slight vertical movement in the precessional axis which does not detract from the precision of measurement.

In order to avoid possible sources of error due to temperature response of the hinge straps, one of the preferred embodiments of the present invention consists in providing hinge straps of a material which has a coefficient of thermal expansion as low as possible.

BRIEF DESCRIPTION OF THE DRAWINGS

The invention together with its advantages, will be explained in greater detail with reference to a sample embodiment shown in the drawings in which.

DESCRIPTION OF THE PREFERRED EMBODIMENTS

Figure 1:
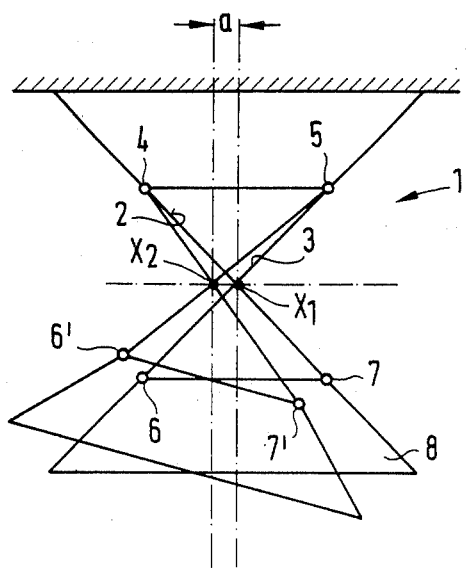
FIG. 1 is a geometric arrangement of a double garnet joint from the prior art shown schematically.

The double garnet joint identified at reference numeral 1 in FIG. 1 corresponds to the prior art, and is formed of straps 2 and 3. These are flexibly disposed at the top of hinge points 4 and 5 and are connected at the bottom to a component 8 containing hinge points 6 and 7. As this structure undergoes a pendular movement toward the side, as illustrated in FIG. 1 in the direction toward the left-hand side, the hinge points 6 and 7 change to new positions 6' and 7'. With an unaltered length of the joint springs 2 and 3, as well as the unaltered position of the hinge points 4 and 5, the optical section $X_1$ derived from the working lines of the springs 2 and 3 is displaced by an amount "a" toward the left into a new position $X_2$ as illustrated in FIG. 1. Consequently, the working line of the joint formed by the straps 2 and 3 is displaced out of the vertical in the horizontal direction.

Figure 2:
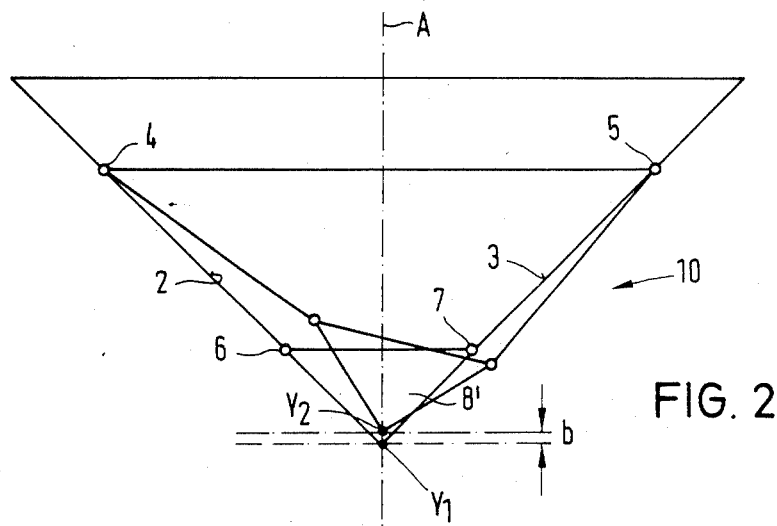
FIG. 2 is a geometric arrangement of a V-strap hinge according to the present invention, also shown in schematic illustration.

The difference in function between the prior art and the V-strap hinge of the present invention is shown in FIG. 2. This Figure shows two joint springs 2 and 3 which are flexibly disposed in upper hinge points 4 and 5. With lower hinge points 6 and 7, the springs 2 and 3 of the V-strap hinge 10 are connected to the element 8' which is symbolized by a triangle. When the system executes a tumbling motion, the hinge point $Y_1$ is displaced along the vertical axis "A" to the position $Y_2$, as a result of rising by the amount "b".

When the vertical axis "A" coincides with the precessional axis of the gyroscope system of the gyroscope load cell, upon excursion of the secondary precessional axis in the case of a double garnet joint, the joint axis $X_1$ laterally migrates away from the precessional axis. In contrast thereto, a joint movement in the case of the V-strap hinge 10 according to the invention causes a displacement of the hinge point $Y_1$ to $Y_2$ in the vertical direction along the precessional axis. Consequently, drift does not occur.

Figure 3:
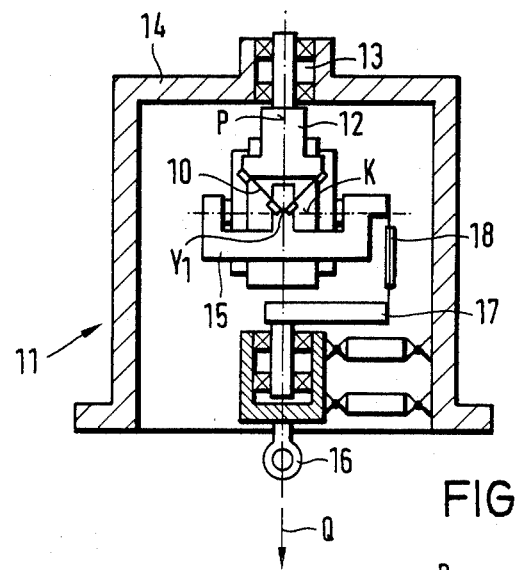
FIG. 3 is a view partly in elevation and partly in cross section of a gyroscope load cell with the improved V-strap hinge between the inner and outer gimbals.

FIG. 3 illustrates a gyroscope load cell 11 equipped with the V-strap hinge 10 according to the present invention. The cell also includes an outer gimbal 12 which is rotatably disposed in a bearing 13 within a housing 14. An inner gimbal 15 is flexibly connected with the V-strap hinge 10 such that the hinge point $Y_1$ and the gyroscopic axis "K" as well as the precessional axis "P" intersect at a point. When a load is applied as indicated by the arrow "Q" at the non-precessing load pick-up 16, this is transmitted over a load arm 17 and a flexible transmission element 18 onto the inner gimbal 15. With a unidirectional pressure application thus applied, a torque is created. The pivot point of the torque is the V-strap hinge point $Y_1$. From the illustration and in view of the above explanations concerning the V-strap hinge, it becomes clear that a nutational motion of the axis "K" around the hinge point $Y_1$ does not result in an excursion out of the precessional axis "P". Consequently, measuring errors which may occur with a double garnet joint are avoided using the arrangement according to the present invention.

Figure 4:
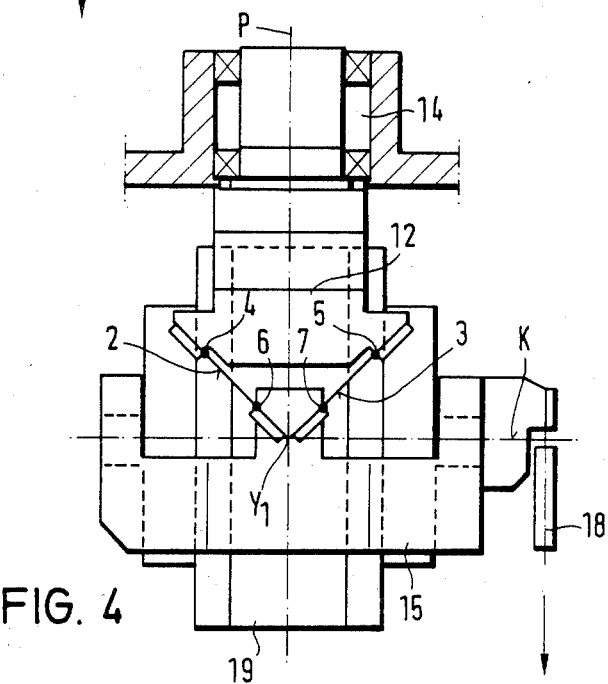
FIG. 4 is an enlarged illustration of the gimbals connected to a V-strap hinge, shown in a side view.

The same arrangement is illustrated in more detail in FIG. 4 on an enlarged scale. This Figure shows the articulations of the hinge straps 2 and 3 each of which has a plurality of hinge points 4, 5, 6, and 7. In the illustration of FIG. 4, the same reference numerals have been used as in FIG. 3. The gyroscope 19 is rotatably supported about the axis "K" as shown in FIG. 4. The V joint axis $Y_1$, the the gyroscopic axis "K" and the precessional axis "P" intersect at a point. This condition is important for the measuring precision of the gyroscope load cell and is also maintained where the axis "K" starts to execute a slight nutational movement around its originally horizontal attitude.

From the foregoing, it will be understood that the present invention provides an improved gyroscope load cell having an improved joint arrangement between the inner and outer gimbals which avoids the errors due to migration of the secondary precessional axis or of the joint axis out of the precessional axis and thereby assures accuracy in the system under all load and operating conditions.

It should be evident that various modifications can be made to the described embodiments without departing from the scope of the present invention.

I claim as my invention:

1. A gyroscope load cell comprising:

a housing, an inner gimbal and an outer gimbal arranged in said housing, a gyroscope arranged to rotate about a gyroscope axis and suspended in said housing by means of said outer and inner gimbals such that the precessional motion of said gyroscope about its precessional axis is proportional to the force to be measured when applied to said inner gimbal, and a link joint comprising a pair of straps having first ends connected to the outer gimbal at points located at a distance to each other in an essentially horiztonal plane and at equal distances from said precessional axis, said straps having their second ends connected to a common point on the inner gimbal, said common point being located at the intersection of said precessional axis and said gyroscope axis.

2. A gyroscope load cell according to claim 1 in which:

said pair of straps is composed of a material having a very low coefficient of thermal expansion.

3. A gyroscope load cell according to claim 1 which includes:

a load arm and a flexible transmission element connected to transmit the load to said inner gimbal.

4. A gyroscope load cell assembly according to claim 1 in which:, said pair of straps consist of leaf shaped arms.

* * * * *